C. A. HOXIE.
ELECTRICAL MEASURING APPARATUS AND THE METHOD OF OPERATING THE SAME.
APPLICATION FILED MAY 19, 1916.

1,266,473.

Patented May 14, 1918.

Inventor:
Charles A. Hoxie,
by *Albert G. Davis*
His Attorney.

UNITED STATES PATENT OFFICE.

CHARLES A. HOXIE, OF SCHENECTADY, NEW YORK, ASSIGNOR TO GENERAL ELECTRIC COMPANY, A CORPORATION OF NEW YORK.

ELECTRICAL MEASURING APPARATUS AND THE METHOD OF OPERATING THE SAME.

1,266,473.      Specification of Letters Patent.      Patented May 14, 1918.

Application filed May 19, 1916. Serial No. 98,565.

*To all whom it may concern:*

Be it known that I, CHARLES A. HOXIE, a citizen of the United States, residing at Schenectady, in the county of Schenectady, State of New York, have invented certain new and useful Improvements in Electrical Measuring Apparatus and the Method of Operating the Same, of which the following is a specification.

The present invention relates to the art of measuring the electrical characteristics of an electric current, such as amperage or voltage, and its object is to provide a means for obtaining a definite or standard current or voltage which may be used as a basis for comparing an electrical quantity to be measured.

In carrying out my invention, an electromotive force varying directly with the first power of a current to be standardized is compared with an electromotive force varying directly with the square of said current. When these two electromotive forces are made equal the current is known to be at the standard value for comparison purposes. The apparatus for carrying out my invention includes a thermo-cell consisting of a sealed envelop containing a gaseous filling, a thermal element, such as a filament traversed by the current to be standardized, and a thermo-couple in close proximity to but out of physical contact with said thermal element.

Other elements of the combination constituting my invention, such for example, as the connections for obtaining an electromotive force varying with the first power of the current to be standardized, and means for indicating electromotive force, as for example, a galvanometer, are enumeratel in the appended claims.

Figure 1:
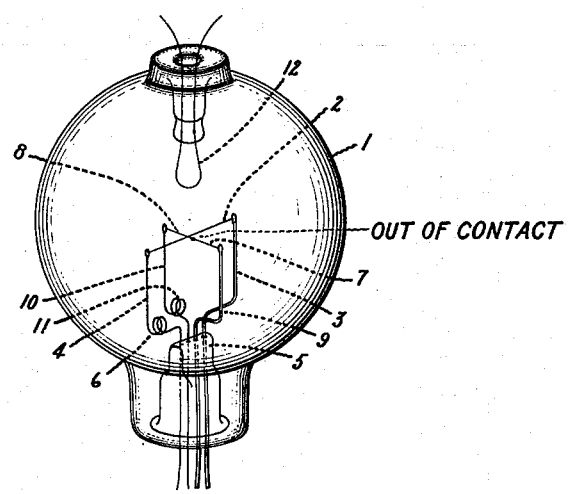
Figure 2:
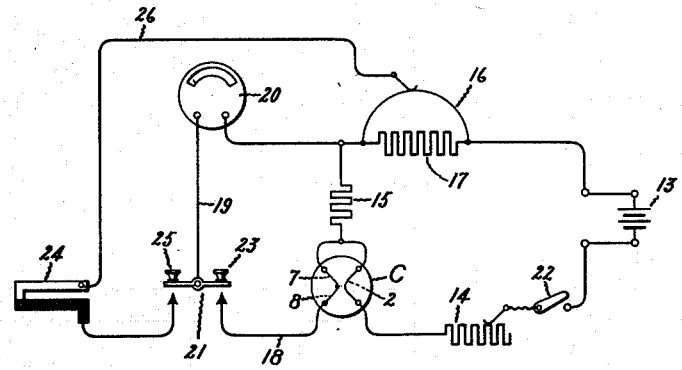

A more complete understanding of my invention may be had from the following description taken in connection with the accompanying drawings in which Figure 1 is a perspective view of a thermo-cell for obtaining an electromotive force varying substantially with the square of a given current, and Fig. 2 is a diagram of connections of an embodiment of my invention.

Referring to Fig. 1, the thermo-cell comprises a sealed envelop or bulb 1, containing a gas such as hydrogen, nitrogen or argon, which is inert with respect to a metal when heated. Within the bulb is located a filamentary heater 2 consisting of tungsten, tantalum, platinum or the like, and connected to conductors 3, 4, sealed into the glass stem 5, a spring 6 serving to maintain the filament taut. For example, the heater filament consists of tungsten etched to a diameter of 0.2 mils. (0.0002 inches) with sodium nitrate. In close proximity to the heater 2, for example, a few thousandths of an inch, so as, to secure as perfect thermal relation as possible, is located a filamentary thermo-couple, comprising wires 7, 8, which may be, for example, about .9 mil. in diameter, consisting respectively of calorite and advance or constantan wire, or other suitable metals, at the junction of which a thermo-electric effect is obtained. Calorite is an alloy of about 62 to 65% nickel, 10 to 12% chromium, 7.5 to 8% manganese, and the balance iron. Advance wire is an alloy of about 49% nickel, 48% copper, and a little manganese and iron. These joined wires or filaments 7, 8, are also supported by sealed-in conductors, the lighter conductor 10 including a coiled spring 11 to prevent sagging.

The pressure of the gaseous filling may be equal to about 2 centimeters of mercury pressure, but may be varied in accordance with the conditions. The gas may be purified, after sealing the bulb, by incandescing therein a filament 12 consisting of tungsten or other suitable chemically active metal. The function of the gas is to assist in the transfer of heat from the filament to the thermo-couple.

As diagrammatically shown in Fig. 2, the heater 2 of the thermo-cell C is connected to a battery 13 in series with an adjustable resistance 14, a fixed resistance 15 and a potentiometer resistance or slide wire 16, shunted by a regulating resistance 17. The resistance is used to merely determine the effective value of the slide wire resistance. The thermo-couple element 7 is connected to one terminal of the resistance 15 in common with the heater 2. The element 8 of the thermo-couple may be connected through the conductors 18, 19, to a galvanometer 20 by a switch 21, the opposite terminal of the galvanometer being connected to a terminal in common with the resistances 15 and 16.

The connections of the thermo-couple should be so chosen that the electromotive force of the thermo-couple opposes the electromotive force across the resistance 15 produced by the heater current. When the switch 22 in the battery circuit is closed the current flows through the heater, and the resistance 15. A balance in the two opposing electromotive forces at the terminals of the resistance 15 may be produced by depressing the key 23, closing the circuit 18, 19, and varying the resistance 14 until a zero reading is noted on the galvanometer.

As the drop of voltage of the heater current in the resistance 15 varies with the first power of the current and the electromotive force of the thermo-couple varies with the square of the heater current, this balance occurs with a perfectly definitely fixed current value. The electromotive force of the thermo-couple in a cell constructed as above described is about 3,000 microvolts when using calorite-advance wire with a current of about 30 milliamperes in the heater. These values are merely illustrative. By means of the described device a current for comparison purposes may be very precisely determined and the device therefore can be used in place of a standard cell. It is more rugged than a standard cell as the present device is not injured by climatic temperature changes.

The value of the slide wire resistance 16 may be accurately determined, and if desired, calibrated and used to measure an unknown potential, for example, the electromotive force of a pyrometer, as indicated at 24. The two potentials may be balanced by depressing the key 25, thereby connecting the thermo-couple to the pyrometer and moving the terminal of the conductor 26 along the potentiometer resistance 16 until a balance is obtained, or by connecting to a definite known point of the resistance and noting the deflection of the galvanometer scale. By proper calibration the temperature may be read directly on the scale of the instrument.

The device may be used as a source of a standard voltage maintaining the resistance 16 invariable, thus obtaining a fixed voltage drop across its terminals when the current traversing the resistance is standardized as above described.

What I claim as new and desire to secure by Letters Patent of the United States, is:—

1. The combination of a gas-tight envelop, a filamentary heater therein, a thermo-couple in close thermal relation to but out of physical contact with said heating element, and a filling of gas within said envelop.

2. The combination of a gas-tight envelop, a filament therein adapted to be heated, a thermo-couple closely adjacent to but out of contact with said filament, a gas within said envelop inert with respect to said filament and couple, at a pressure of about 2 centimeters of mercury, and electrical connections for said filament and said couple.

3. The method of standardizing a current which consists in generating an electromotive force by the heating effect of the current to be standardized, said electromotive force varying substantially with the square of the current, balancing said electromotive force against an electromotive force varying with the first power of the current to be standardized, and varying said current until said electromotive forces are equal.

4. A device for obtaining a current of standard value comprising an electric circuit, a source of current of substantially constant voltage connected to said circuit, a fixed resistance traversed by said current, means for balancing against the electromotive force at the terminals of said resistance with an electromotive force varying substantially with the square of the current in said circuit, means for adjusting the current from said source, and means for indicating when the electromotive force at the terminals of said resistance is zero.

5. A device for obtaining a current of standard value comprising a source of current, an adjustable resistance in circuit with said source, a thermal element connected to receive current from said source, a thermo-electric element in close proximity to said thermal element, and generating an electromotive force varying substantially with the temperature of said thermal element, a resistance in circuit with both said elements connected so that the electromotive forces from said elements are in opposition, and a galvanometer for indicating when the electromotive force at the terminals of said resistance becomes zero.

6. A device for standardizing a current comprising a source of current, a thermal element, circuit connections between said source and said element, means for varying the current furnished by said source to said element, means for furnishing an electromotive force varying with the temperature of said thermal element, means for furnishing an opposing electromotive force varying at the same rate as the current through said thermal element, and means for balancing the opposing electromotive forces.

7. An electrical standardizing device comprising the combination of a gas-tight envelop, a filament of refractory conducting material therein, a filamentary thermo-couple located at a distance of a few thousandths of an inch from said filament, and a filling of gas within said envelop.

8. An electrical standardizing device comprising the combination of a sealed bulb, a filamentary heater of refractory metal therein having a diameter of about 0.2 mil., a filamentary thermo-couple having a diameter of about .9 mil. removed not more than about a few thousandths of an inch from said filament, and a filling of gas inert with respect to said filament at a pressure high enough to materially assist in the transfer of heat from the filament to the thermo-couple.

In witness whereof, I have hereunto set my hand this 18th day of May, 1916.

CHARLES A. HOXIE.

---

Correction in Letters Patent No. 1,266,473.

It is hereby certified that in Letters Patent No. 1,266,473, granted May 14, 1918, upon the application of Charles A. Hoxie, of Schenectady, New York, for an improvement in "Electrical Measuring Apparatus and the Method of Operating the Same," an error appears in the printed specification requiring correction as follows: Page 1, line 63, for the word "nitrate" read *nitrite;* and that the said Letters Patent should be read with this correction therein that the same may conform to the record of the case in the Patent Office.

Signed and sealed this 4th day of June, A. D., 1918.

[SEAL.]

F. W. H. CLAY,

*Acting Commissioner of Patents.*

Cl. 175—183.